United States Patent
Hein et al.

(10) Patent No.: US 12,037,122 B2
(45) Date of Patent: Jul. 16, 2024

(54) SYSTEMS AND METHODS FOR AN ICE RUNBACK CONTROL ZONE IN AN ELECTROTHERMAL ICE PROTECTION SYSTEM

(71) Applicant: GOODRICH CORPORATION, Charlotte, NC (US)

(72) Inventors: Brandon Hein, Stow, OH (US); Casey M. Slane, Tallmadge, OH (US); Galdemir C. Botura, Copley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/713,912

(22) Filed: Apr. 5, 2022

(65) Prior Publication Data

US 2023/0312111 A1    Oct. 5, 2023

(51) Int. Cl.
*B64D 15/14*    (2006.01)
*B64D 15/20*    (2006.01)

(52) U.S. Cl.
CPC ............. *B64D 15/14* (2013.01); *B64D 15/20* (2013.01)

(58) Field of Classification Search
CPC .................................................... B64C 15/163
See application file for complete search history.

(56) References Cited

U.S. PATENT DOCUMENTS

| | | | | |
|---|---|---|---|---|
| 4,894,569 A | * | 1/1990 | Lardiere, Jr. | ........... H01F 7/202 318/116 |
| 4,982,121 A | * | 1/1991 | Lardiere, Jr. | ........... H01F 7/202 318/116 |
| 5,074,497 A | * | 12/1991 | Phillips, II | ........... B64D 15/163 244/134 A |
| 5,129,598 A | * | 7/1992 | Adams | ........... B64D 15/163 244/134 A |
| 5,142,767 A | * | 9/1992 | Adams | ........... H01F 17/0006 336/200 |
| 5,143,325 A | * | 9/1992 | Zieve | ........... B64D 15/163 244/134 D |
| 5,152,480 A | * | 10/1992 | Adams | ........... B64D 15/12 244/134 D |
| 5,314,145 A | * | 5/1994 | Rauckhorst, III | ... B64D 15/166 244/134 A |

(Continued)

FOREIGN PATENT DOCUMENTS

EP    3187882    7/2017

OTHER PUBLICATIONS

European Patent Office, European Search Report dated Dec. 4, 2023 in Application No. 23164317.2.

(Continued)

*Primary Examiner* — Joshua J Michener
*Assistant Examiner* — Michael B. Kreiner
(74) *Attorney, Agent, or Firm* — SNELL & WILMER L.L.P.

(57) ABSTRACT

An aircraft wing may comprise an airfoil having deicing zone, an anti-icing zone, and an ice runback control zone. An aircraft wing may comprise an electro-thermal ice protection system disposed in the aircraft wing. The electro-thermal ice protection system may be disposed along the deicing, anti-icing, and ice runback control zones of the airfoil to improve aerodynamic performance of the aircraft and reduce ice formation along the wings of the aircraft.

7 Claims, 7 Drawing Sheets

(56) References Cited

U.S. PATENT DOCUMENTS

| | | | | |
|---|---|---|---|---|
| 5,429,327 | A * | 7/1995 | Adams | B64D 15/163 |
| | | | | 244/134 R |
| 5,553,815 | A * | 9/1996 | Adams | B64D 15/163 |
| | | | | 244/134 R |
| 5,609,314 | A * | 3/1997 | Rauckhorst, III | B64D 15/166 |
| | | | | 244/134 A |
| 5,657,951 | A | 8/1997 | Giamati et al. | |
| 5,904,322 | A * | 5/1999 | Giamati | B64D 15/166 |
| | | | | 244/134 B |
| 6,129,314 | A * | 10/2000 | Giamati | B64D 15/163 |
| | | | | 244/134 A |
| 6,283,411 | B1 * | 9/2001 | Giamati | B64D 15/12 |
| | | | | 244/134 A |
| 7,278,610 | B2 | 10/2007 | Giamati | |
| 7,780,117 | B2 | 8/2010 | Botura et al. | |
| 10,118,705 | B2 * | 11/2018 | Hull | B64D 15/20 |
| 10,124,902 | B2 * | 11/2018 | Hull | B64D 15/22 |
| 10,137,994 | B2 * | 11/2018 | Hull | B64D 15/12 |
| 2013/0284856 | A1 * | 10/2013 | Botura | B64D 15/20 |
| | | | | 244/134 F |
| 2014/0070054 | A1 | 3/2014 | Burton et al. | |
| 2019/0112055 | A1 | 4/2019 | Burton et al. | |

OTHER PUBLICATIONS

European Patent Office, European Partial Search Report dated Sep. 1, 2023 in Application No. 23164317.2.

* cited by examiner

SYSTEMS AND METHODS FOR AN ICE RUNBACK CONTROL ZONE IN AN ELECTROTHERMAL ICE PROTECTION SYSTEM

FIELD

This disclosure relates to electrothermal ice protection systems, more specifically, integration of an ice runback control zone in an electrothermal ice protection system.

BACKGROUND

During aircraft flight, ice may form along the leading edge of an aircraft wing, degrading performance and the aerodynamics of the aircraft. Leading edges typically include ice protection systems. Some ice protection systems may include anti-icing or de-icing zones, preventing the ice formation before it becomes dangerous. Electro-thermal deicing systems may generate heat within a wing structure to prevent ice formation or enable the aircraft to shed ice.

SUMMARY

An aircraft wing is disclosed herein. In various embodiments, the aircraft wing may comprise a sensor, an airfoil of the aircraft wing, and an electro-thermal ice protection system. In various embodiments, the sensor may be configured to detect ice formation. In various embodiments, the airfoil may further comprise a deicing zone. In various embodiments, the airfoil may further comprise an anti-icing zone. In various embodiments, the airfoil may comprise an ice runback zone.

In various embodiments, the electro-thermal ice protection system may be disposed along the aircraft wing. In various embodiments, the electro-thermal ice protection system may be disposed along the deicing, anti-icing, and ice runback control zone.

In various embodiments, the electro-thermal ice protection system may comprise an electro-thermal strip. In various embodiments, the electro-thermal ice protection system may comprise a first coil. In various embodiments, the first coil may be disposed proximate an upper portion of the airfoil. In various embodiments, the first coil may be configured to be energized. In various embodiments, the first coil may be configured to permit an electric current to pass through the first coil.

In various embodiments, the elector-thermal ice protection system may comprise a second coil. In various embodiments, the second coil may be disposed proximate a lower portion of the airfoil. In various embodiments, the second coil may be configured to be energized. In various embodiments, the second coil may be configured to permit an electric current to pass through the second coil. In various embodiments, the first coil may be configured to induce a first magnetic field. In various embodiments, the second coil may be configured to induce a second magnetic field. In various embodiments, the first and second magnetic fields may be configured to repel one another. In various embodiments, the first coil and the second coil may be configured to heat the airfoil.

An electro-thermal ice protection system is disclosed herein. In various embodiments, the electro-thermal ice protection system may comprise an electro-thermal strip. In various embodiments, the electro-thermal ice protection system may comprise a first coil. In various embodiments, the electro-thermal ice protection system may comprise a second coil. In various embodiments, the electro-thermal ice protection system may be disposed along an ice runback control zone of an aircraft wing.

In various embodiments, the first coil may be disposed proximate an upper portion of an airfoil of the aircraft wing. In various embodiments, the second coil may be disposed proximate a lower portion of the airfoil of the aircraft wing. In various embodiments, the electro-thermal ice protection system may be electrically coupled to a power supply. In various embodiments, the power supply may be configured to send an electric current to the electro-thermal ice protection system. In various embodiments, the first coil may be configured to energize with the electric current. In various embodiments, the second coil may be configured to energize with the electric current.

In various embodiments, the first coil may be configured to induce a first magnetic field. In various embodiments, the second coil may be configured to induce a second magnetic field. In various embodiments, the first magnetic field and the second magnetic field may be configured to repel one another. In various embodiments, the first coil and the second coil may be configured to heat the ice runback control zone.

A method of operating an electro-thermal ice protection system is also disclosed herein. In various embodiments, the method may comprise activating an electro-thermal ice protection system in an aircraft wing. In various embodiments, the aircraft wing may comprise an airfoil. In various embodiments, the airfoil may further comprise a leading edge. In various embodiments, the electro-thermal ice protection system may further comprise an electro-thermal strip, a first coil, and a second coil. In various embodiments, the method may further comprise energizing the first coil. In various embodiments, the method may comprise energizing the second coil. In various embodiments, the method may comprise heating the airfoil.

In various embodiments, the activating may further comprise activating the electro-thermal ice protection system in a deicing zone of the leading edge. In various embodiments, the activating may further comprise activating the electro-thermal ice protection system in an anti-icing zone of the leading edge. In various embodiments, the activating may further comprise activating the electro-thermal ice protection system in an ice runback control zone of the leading edge.

In various embodiments, energizing the first coil may further comprise inducing a first magnetic field. In various embodiments, energizing the second coil may further comprise inducing a second magnetic field. In various embodiments, the first magnetic field and the second magnetic field may be configured to repel one another. In various embodiments, energizing the first coil may comprise heating the electro-thermal strip. In various embodiments, energizing the second coil may comprise heating the electro-thermal strip. In various embodiments, the heating of the electro-thermal strip by the first coil and the second coil may further comprise heating the airfoil.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
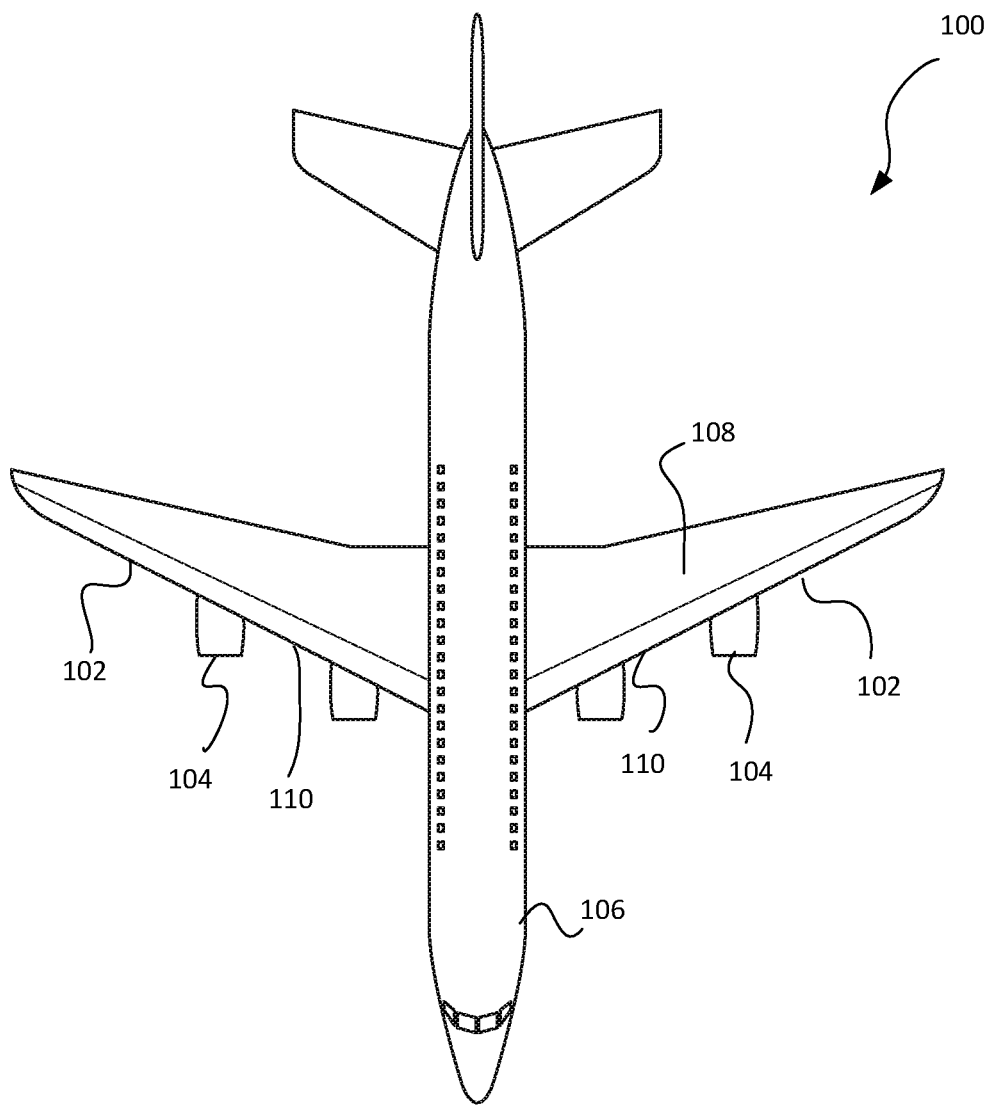
FIG. 1 illustrates an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

An aircraft must be pushed through the air to generate lift. Aircraft wings may generate most of the lift necessary to hold the aircraft in the air. Accordingly, aircraft wings may be shaped as an airfoil. An airfoil may be a cross-sectional shape of an object whose motion through a gas is capable of generating significant lift. The air may resist aircraft motion in the form of aerodynamic drag. Turbine engines may provide thrust to overcome drag and push the aircraft forward. A wing's aerodynamic efficiency may be expressed as a lift-to-drag ratio. A high lift-to-drag ratio may require a smaller thrust to propel the wings through the air at sufficient lift, and vice versa.

Ice formation on a leading edge of a wing may disrupt or destroy the smooth flow of air along the wing, increasing drag while decreasing the ability of the wing to create lift. Accordingly, ice formation on the leading edge of a wing may prevent an aircraft from taking off or interfere with flight. Electro-thermal ice protection systems may be installed along the leading edges of aircraft wings to heat the airfoil and prevent ice formation.

Electro-thermal ice protection systems may heat the wing's leading edge to just above the freezing point of water, melting the ice in cycles. Other electro-thermal systems may heat the leading edge enough to evaporate moisture on contact, preventing it from escaping and refreezing elsewhere as "runback" ice. Such thermal evaporative systems, like those using engine bleed air, need constant electrical power to operate. Accordingly, it may be advantageous to deploy an electro-thermal system that heats the leading edge to just above the freezing point of water (using less electrical power), while also deploying an electro-thermal system at an ice runback control zone. This may allow the aircraft to preserve power while improving safety and reducing aerodynamic degradation.

Referring to FIG. 1 an aircraft 100 is shown in accordance with various embodiments. The aircraft 100 may comprise wings 102 to generate lift, turbine engines 104 to provide thrust, and a fuselage 106 to hold the aircraft components together and carry passenger and cargo. The aircraft wings 102 may further comprise an electro-thermal ice protection system 108 in the wings 102.

Figure 2:
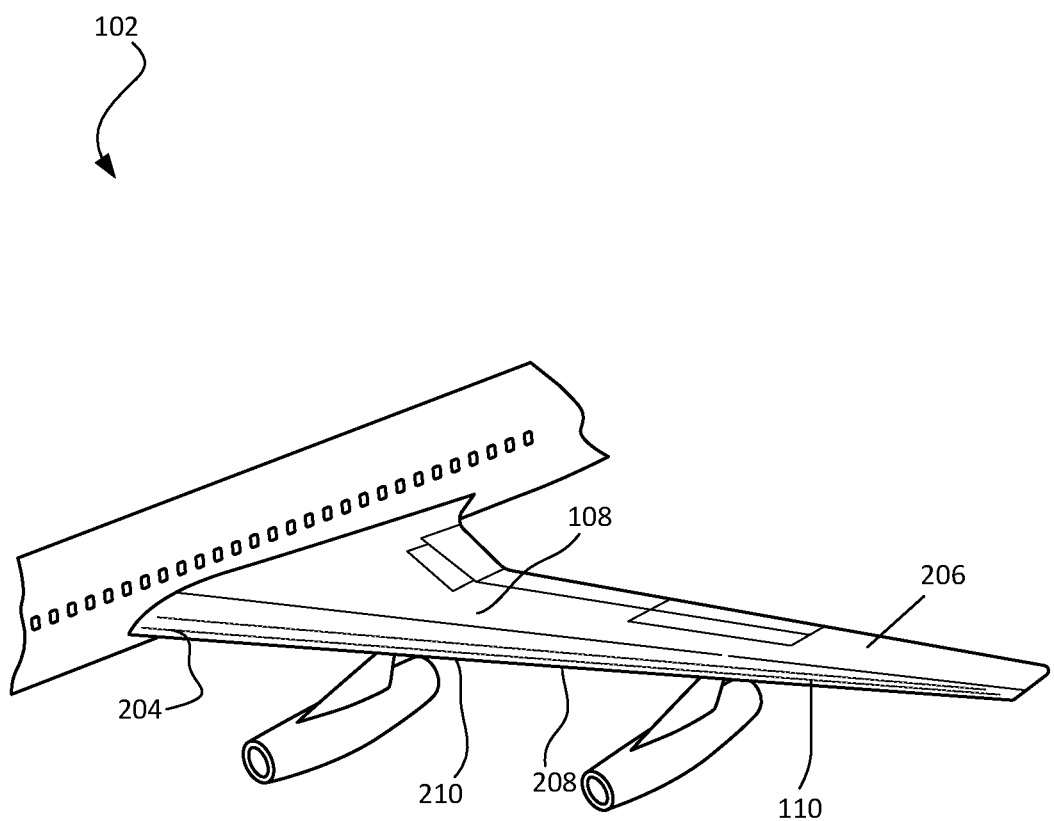
FIG. 2 illustrates an aircraft wing, in accordance with various embodiments.

Referring to FIG. 2, the aircraft wing 102 is shown in accordance with various embodiments. In various embodiments, the aircraft wing 102 may comprise a sensor 204, an airfoil 206, and the electro-thermal ice protection system 108. In various embodiments, the sensor 204 may detect ice formation. In various embodiments, the electro-thermal ice protection system 108 may be activated in response to the sensor 204 detecting ice formation.

As will be discussed in greater detail below, electro-thermal ice systems may comprise coils that may be energized with an electric current. The energized coils may be embedded within the wing 102 and may generate repelling magnetic fields that are passed as heat to the surrounding airfoil 206. In various embodiments, etched foil heating coils may be bonded to the inside of a wing to heat a leading edge. In various embodiments, graphite foil may be attached to a wing's leading edge, wherein electric heaters may then heat the foil, melting the ice.

Figure 3:
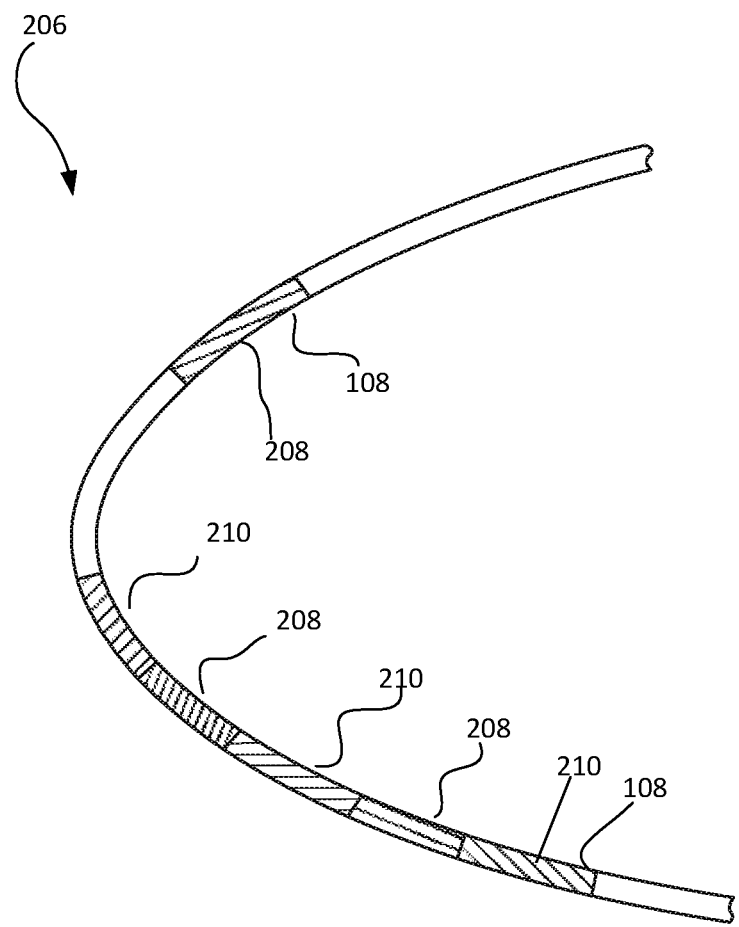
FIG. 3 illustrates a cross-section portion of a leading edge of the wing having an anti-ice zone and a deice zone, in accordance with various embodiments.

In various embodiments, heat may be proactively generated before ice formation along the leading edge 110 of the airfoil 206 at anti-ice zones 208 of the airfoil 206. Accordingly, ice formation may be prevented at the anti-ice zones 208 of the airfoil 206. In various embodiments, heat may be generated following ice formation at deice zones 210 of the airfoil 206. Electro-thermal deicing systems may enable the cracking of ice along the leading edge and may permit ambient air or airflow to discharge the ice from the leading edge. Accordingly, ice may be removed by a combination of thermal and aerodynamic force. In various embodiments, and as shown in FIG. 3, the electro-thermal ice protection system 108 may be a hybrid protection system disposed along both anti-ice 208 and deice zones 210 of the airfoil 206.

Figure 4:
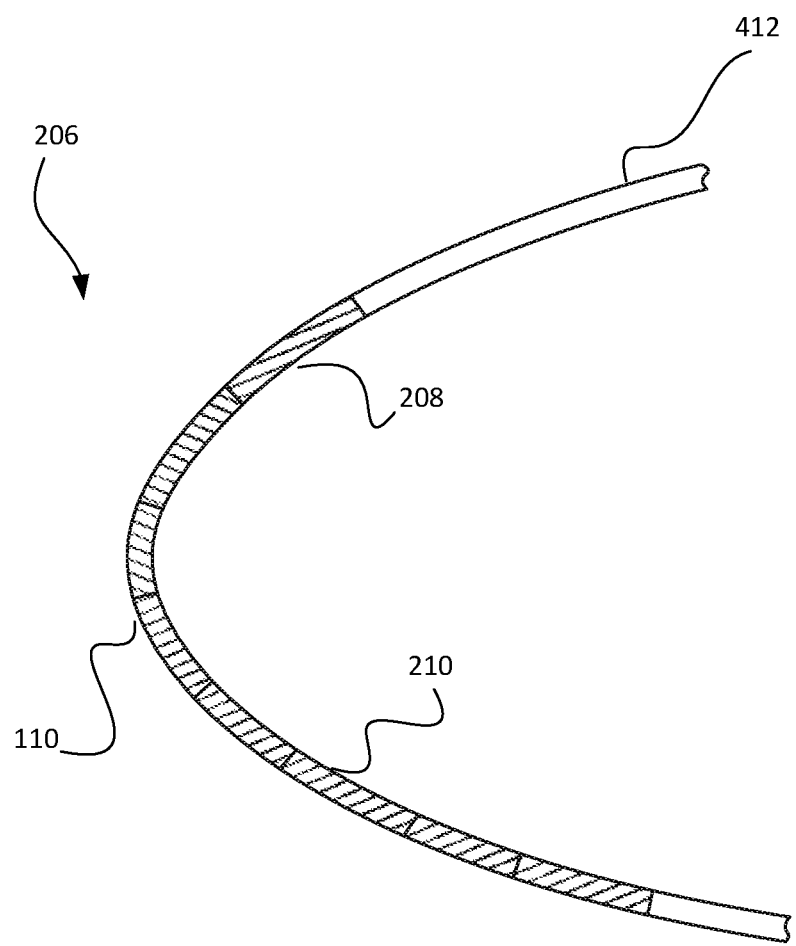
FIG. 4 illustrates a cross-section portion of the leading edge of the wing having anti-ice zones, deice zones, and an ice runback control zone, in accordance with various embodiments.

Referring to FIG. 4, in various embodiments, the airfoil 206 may comprise an ice runback control zone 412 in addition to anti-ice 208 and deicing zones 210. As ice is melted at deice zones 210 along the leading edge 110 or maintained as water film at anti-ice zones 208 along the leading edge 110, the water film and droplets may run over the leading edge 110, reaching the ice runback control zone 412. At temperatures at or below freezing (0 degrees Celsius and below; 32 degrees Fahrenheit and below), the water film may refreeze and form runback ice at an ice runback zone. In disposing an electro-thermal ice protection system in the ice runback zone, runback ice may be melted away or prevented by either one of deicing or anti-icing mechanisms. Accordingly, disposing an electro-thermal ice protection system in the ice runback zone may form an ice runback control zone 412. It may be advantageous to remove runback ice to improve aerodynamic performance and reduce safety hazards.

In various embodiments, the ice runback control zone 412 may be at least one zone. For example, the ice runback control zone 412 may be one panel of a wing. In various embodiments, the ice runback control zone 412 may comprise two or more panels of a wing.

Accordingly, and with additional reference to FIG. 1, the electro-thermal ice protection system 108 may be disposed along various areas of the aircraft wing 102. In various embodiments, the electro-thermal ice protection system 108 may be disposed along the deicing 210, anti-icing 208, and/or ice runback control zones 412 of the wing airfoil 206.

In various embodiments, a deicing or anti-icing cycle at the leading edge 110 in a hybrid electro-thermal ice protection system may be as long as 1 minute. In various embodiments, deicing and anti-icing cycles may be between 1 minute and 2 minutes long. In various embodiments, deicing and anti-icing cycles may occur at various cadences, simultaneously, or at different intervals of time.

In various embodiments, a deicing or anti-icing cycle at the ice runback control zone 412 may be up to 3 minutes long, between 3 minutes and 4 minutes, 4 minutes and 5 minutes, or 5 minutes to 10 minutes long. This may be enabled by slower ice buildup at the ice runback control zone 412 when compared to ice formation along the leading edge 110. For example, ice formation may reach a mass at which aerodynamic performance is degraded much faster than ice formation at the ice runback control zone 412. The leading edge 110 may catch water at a higher rate than the ice runback zone 412 since the ice runback control zone 412 is typically the last zone to catch water. Moreover, at the ice runback control zone 412, it may take more time for the water film to refreeze and reach a thickness that may be detrimental to aerodynamic performance and flow.

The slower ice buildup enables a longer deicing or anti-icing cycle at the ice runback control zone 412 when compared to cycles at zones along the leading edge 110. Longer cycles at the ice runback control zone 412 may also minimize the energy requirements on the aircraft 100 when running a cycle, as compared to cycles at zones along the leading edge 110. Accordingly, the electro-thermal ice protection system 108 at the ice runback control zone 412 may enable an icing collection efficiency of the ice runback control zone 412 to be at or near zero. Collection efficiency, or "catch rate," of an aircraft component may be the fraction of liquid water in the direct path of an aircraft component which is deposited as ice on that component. Accordingly, a high collection efficiency may be associated with rapid ice accumulation, while a low collection efficiency may be associated with decreased ice formation. Lower collection efficiencies may be desired to increase aerodynamic performance.

Figure 5A:
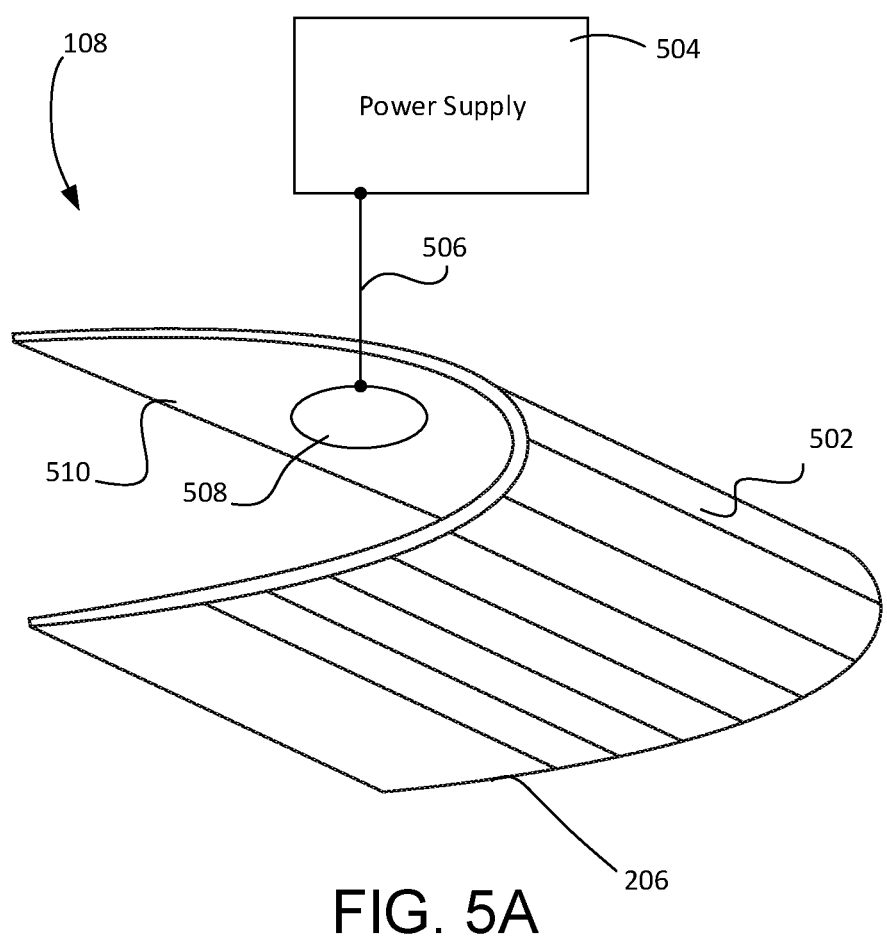
FIG. 5A illustrates a cross-section portion of the leading edge of the wing having an electro-thermal strip and a coil, in accordance with various embodiments.
Figure 5B:
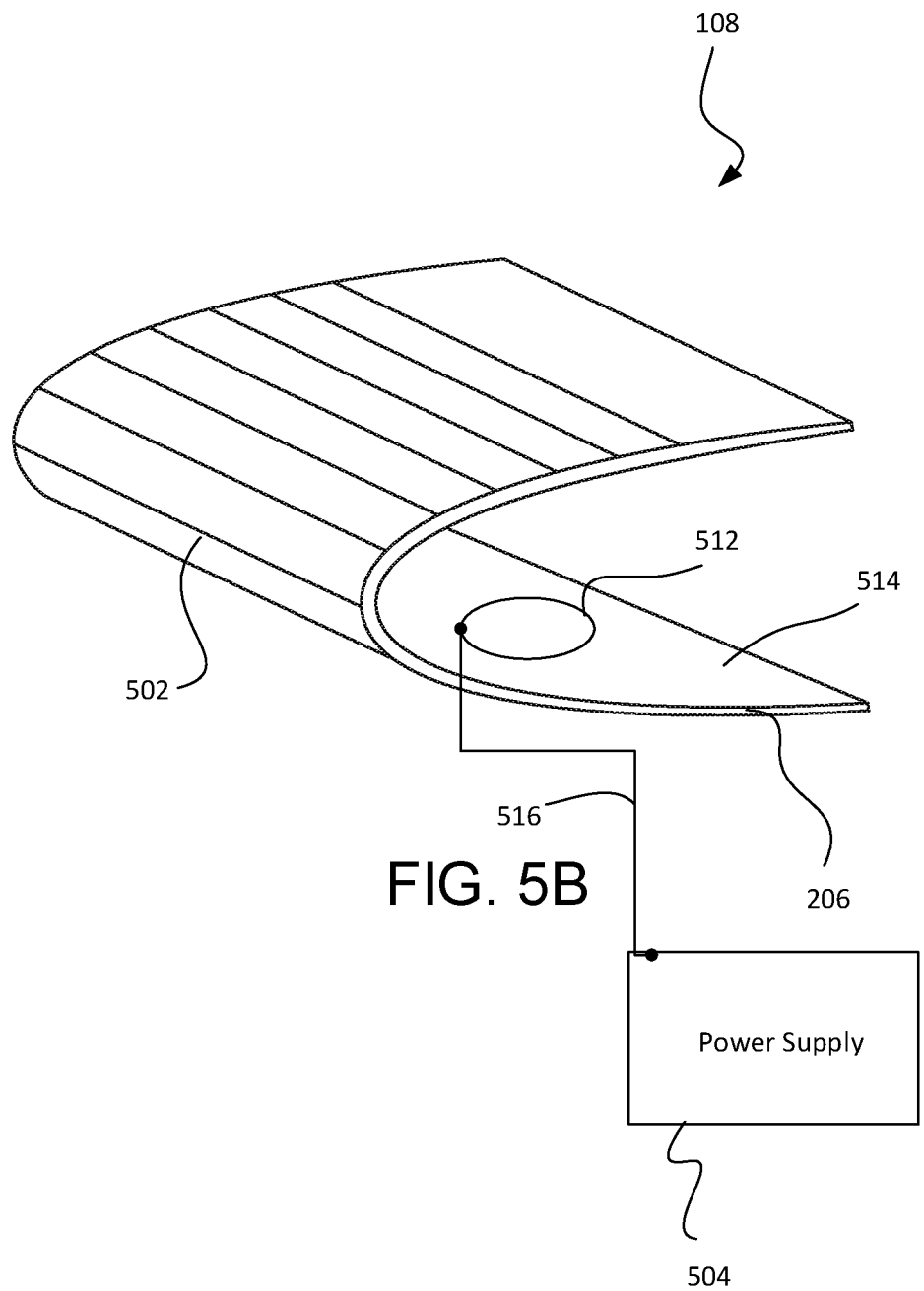
FIG. 5B illustrates a cross-section portion of the leading edge of the wing having an electro-thermal strip and a coil, in accordance with various embodiments.

As shown in FIGS. 5A and 5B, in various embodiments, the electro-thermal ice protection system 108 is shown with the airfoil 206. The electro-thermal ice protection system may comprise an electro-thermal strip 502. In various embodiments, the electro-thermal ice protection system 108 may be electrically coupled to a power supply 504, such as, for example, an auxiliary power unit (APU). The power supply 504 may send an electric current 506 to the electro-thermal ice protection system 108.

In various embodiments, as shown in FIG. 5A, the electro-thermal ice protection system 108 may comprise a first coil 508. In various embodiments, the first coil 508 may be disposed proximate an upper portion 510 of the airfoil 206. In various embodiments, the first coil 508 may be energized by an electric current 506. In various embodiments, the first coil 508 may permit an electric current 506 to pass through the first coil 508.

In various embodiments, as shown in FIG. 5B, the electro-thermal ice protection system 108 may comprise a second coil 512. In various embodiments, the second coil 512 may be disposed proximate a lower portion 514 of the airfoil 206. In various embodiments, the second coil 512 may be energized by an electric current 516. In various embodiments, the second coil 512 may permit an electric current 516 to pass through the second coil 512.

In various embodiments, the first coil 508 may induce a first magnetic field. In various embodiments, the second coil 512 may induce a second magnetic field. In various embodiments, the first and second magnetic fields may repel one another. In various embodiments, the repelling magnetic fields induced by the first coil 508 and the second coil 512 may be passed as heat onto the airfoil 206, thus heating the airfoil 206. In various embodiments, and with further reference to FIG. 4, the repelling magnetic fields induced by the first coil 508 and the second coil 512 may be passed as heat on the ice runback control zone 412 of the airfoil 206.

Figure 6:
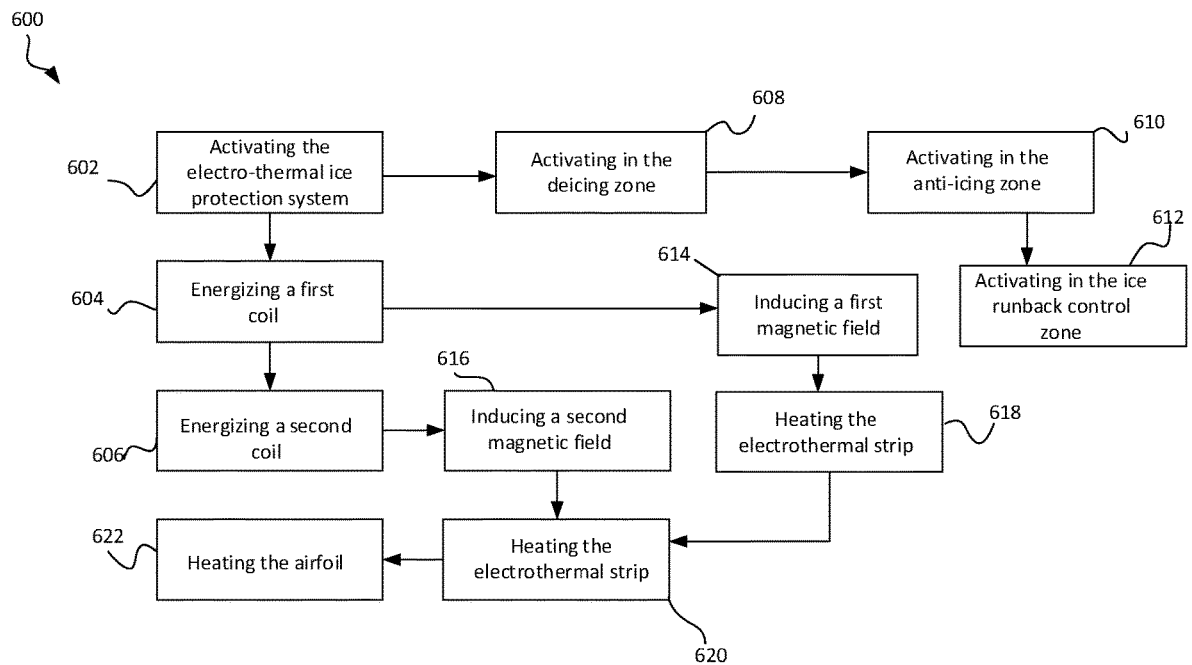
FIG. 6 illustrates a method of testing an electro-thermal ice protection system, in accordance with various embodiments.

Referring to FIG. 6, a method (step 600) of testing an electro-thermal ice protection system is shown. In various embodiments, the method (step 600) may comprise activating (step 602) the electro-thermal ice protection system in an aircraft wing. In various embodiments, the aircraft wing may comprise an airfoil. In various embodiments, the airfoil may further comprise a leading edge. In various embodiments, the electro-thermal ice protection system may further comprise an electro-thermal strip, a first coil, and a second coil. In various embodiments, the method (step 600) may further comprise energizing (step 604) the first coil. In various embodiments, the method (step 600) may comprise energizing (step 606) the second coil. In various embodiments, the method (step 600) may comprise heating (step 607) the airfoil.

In various embodiments, the activating (step 602) may further comprise activating (step 608) the electro-thermal ice protection system in a deicing zone of the leading edge. In various embodiments, the activating (step 602) may further comprise activating (step 610) the electro-thermal ice protection system in an anti-icing zone of the leading edge. In various embodiments, the activating (step 602) may further comprise activating (step 612) the electro-thermal ice protection system in an ice runback control zone of the leading edge.

In various embodiments, energizing (step 604) the first coil may further comprise inducing (step 614) a first magnetic field. In various embodiments, energizing (step 606) the second coil may further comprise inducing (step 616) a second magnetic field. In various embodiments, the first magnetic field and the second magnetic field may be configured to repel one another. In various embodiments, energizing (step 604) the first coil may comprise heating (step 618) the electro-thermal strip. In various embodiments, energizing (step 606) the second coil may comprise heating (step 620) the electro-thermal strip. In various embodiments, the heating (step 618/620) of the electro-thermal strip by the first coil and the second coil may further comprise heating (step 622) the airfoil.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft wing, comprising:
 a sensor, wherein the sensor is configured to detect ice formation;
 an airfoil of the aircraft wing, wherein the airfoil further comprises:
 a deicing zone;
 an anti-icing zone;
 an ice runback control zone; and
 an electro-thermal ice protection system, wherein the electro-thermal ice protection system is disposed along the aircraft wing, wherein the electro-thermal ice protection system is disposed along the deicing, anti-icing, and ice runback control zone, wherein the electro-thermal ice protection system comprises a first coil and a second coil, wherein the first coil is configured to induce a first magnetic field, wherein the second coil is configured to induce a second magnetic field, wherein the first magnetic field and the second magnetic field are configured to repel one another, and wherein a repelling magnetic field generated by the first magnetic field of the first coil and the second magnetic field of the second coil is configured to generate heat that heats the airfoil.

2. The aircraft wing of claim 1, wherein the electro-thermal ice protection system comprises an electro-thermal strip.

3. The aircraft wing of claim 2, wherein the electro-thermal strip is disposed within the airfoil.

4. The aircraft wing of claim 1, wherein the first coil is disposed proximate an upper portion of the airfoil, wherein the first coil is configured to be energized, wherein the first coil is configured to permit an electric current to pass through the first coil.

5. The aircraft wing of claim 4, wherein the first coil is etched into and embedded within the upper portion of the airfoil.

6. The aircraft wing of claim 1, wherein the second coil is disposed proximate a lower portion of the airfoil, wherein the second coil is configured to be energized, wherein the second coil is configured to permit an electric current to pass through the second coil.

7. The aircraft wing of claim 6, wherein the second coil is etched into and embedded within the lower portion of the airfoil.

\* \* \* \* \*